(12) United States Patent
Scheckelhoff et al.

(10) Patent No.: US 11,985,502 B2
(45) Date of Patent: May 14, 2024

(54) SYSTEM AND METHOD FOR SEEKING OWNER AUTHORIZATION FOR AN APPLIANCE TO ENTER A BOOT LOADER FOR A SOFTWARE UPDATE

(71) Applicant: Haier US Appliance Solutions, Inc., Wilmington, DE (US)

(72) Inventors: Ryan James Scheckelhoff, Louisville, KY (US); Richard Dean Suel, II, Louisville, KY (US); John Gilman Chapman, Jr., Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 322 days.

(21) Appl. No.: 17/391,323

(22) Filed: Aug. 2, 2021

(65) Prior Publication Data

US 2023/0030947 A1  Feb. 2, 2023

(51) Int. Cl.
*H04W 12/08* (2021.01)
*D06F 34/05* (2020.01)
*D06F 34/08* (2020.01)
*G06F 8/65* (2018.01)
*G06F 21/57* (2013.01)

(52) U.S. Cl.
CPC ............ *H04W 12/08* (2013.01); *D06F 34/05* (2020.02); *D06F 34/08* (2020.02); *G06F 8/65* (2013.01); *G06F 21/575* (2013.01); *G06F 2221/033* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,513,797 B2 | 12/2016 | Katrin | |
| 10,608,835 B2 | 3/2020 | Ha | |
| 2004/0125146 A1 | 7/2004 | Gerlach | |
| 2009/0090137 A1 | 4/2009 | Haeng | |
| 2011/0112601 A1* | 5/2011 | Meadows | A61N 1/37223 607/42 |
| 2017/0006528 A1* | 1/2017 | Bari | H04W 4/00 |
| 2017/0337050 A1 | 11/2017 | Iwami et al. | |
| 2020/0116445 A1* | 4/2020 | Walsh | F28G 13/00 |
| 2020/0162247 A1* | 5/2020 | Nix | H04L 9/0841 |

FOREIGN PATENT DOCUMENTS

| | | |
|---|---|---|
| CN | 105350258 A | 2/2016 |
| CN | 106371872 A | 2/2017 |
| CN | 108352011 A | 7/2018 |
| EP | 3716182 A1 | 9/2020 |

* cited by examiner

*Primary Examiner* — William J. Goodchild
(74) *Attorney, Agent, or Firm* — Dority & Manning, P.A.

(57) ABSTRACT

An appliance includes an external communication port, such as an RJ45 port, and a wireless communication module in wireless communication with a remote server through an external network. In addition, a controller includes a boot loader segment and is configured to receive a request to access the boot loader segment of the controller, transmit a notification of the request to the remote server using the wireless communication module, receive an access determination from the remote server, e.g., such as an access authorization or denial from an owner, and regulate access to the boot loader segment based at least in part on the access determination.

20 Claims, 4 Drawing Sheets

SYSTEM AND METHOD FOR SEEKING OWNER AUTHORIZATION FOR AN APPLIANCE TO ENTER A BOOT LOADER FOR A SOFTWARE UPDATE

FIELD OF THE INVENTION

The present subject matter relates generally to appliances, or more specifically, to methods of operating commercial appliance to seek owner approval prior to making certain software changes.

BACKGROUND OF THE INVENTION

Certain conventional laundry appliances are becoming more connected with features that involve financial transactions or which may otherwise require owner approval to perform an operating cycle. For example, certain commercial appliances, such as washing machines and clothes dryers at a laundromat, might have currency-based operating systems that require a user to pay some form of currency before an operating cycle will begin. Similarly, purchasers of residential appliances may purchase an appliance with hopes of recouping some of the purchase price by charging for appliance usage. This may be common particularly in light of the rise of shared living arrangements, home rental services, and other shared appliance situations. For example, a homeowner who rents their house on a rental website might wish to charge renters for their use of the appliance, a tenant who purchases an appliance may wish to charge their roommates for appliance use, or an appliance owner may wish to generate a revenue steam from owned appliances in other situations as well.

Such pay-per-use commercial appliances may be exposed to an increased likelihood of appliance tampering. For example, conventional commercial appliances such as a washer or dryer may include an external RJ45 connection that may be used for programming, data collection, and load control during development. This connection point can create a security risk in a commercial environment where the public or another unauthorized user has access to the appliance and RJ45 port. By contrast, in some cases, the owner or a service technician may need to use the RJ45 to update firmware on the appliance, e.g., when the update is not standard or is not widely distributed through a wireless network.

Accordingly, systems and methods for regulating access to a controller of an appliance would be desirable. More specifically, a system and method that provides an appliance owner full control over authorizing or denying access to one or more portions of an appliance controller would be particularly beneficial.

BRIEF DESCRIPTION OF THE INVENTION

Advantages of the invention will be set forth in part in the following description, or may be apparent from the description, or may be learned through practice of the invention.

In one exemplary embodiment, an appliance is provided including a cabinet, an external communication port positioned on the cabinet, a wireless communication module in wireless communication with a remote server through an external network, and a controller including a boot loader segment and being in operative communication with the external communication port and the wireless communication module. The controller is configured to receive a request to access the boot loader segment of the controller, transmit a notification of the request to the remote server using the wireless communication module, receive an access determination from the remote server, and regulate access to the boot loader segment based at least in part on the access determination.

In another exemplary embodiment, a method of operating an appliance is provided. The appliance includes an external communication port, a wireless communication module in wireless communication with a remote server through an external network, and a controller comprising a boot loader segment. The method includes receiving a request to access the boot loader segment of the controller, transmitting a notification of the request to the remote server using the wireless communication module, receiving an access determination from the remote server, and regulating access to the boot loader segment based at least in part on the access determination.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
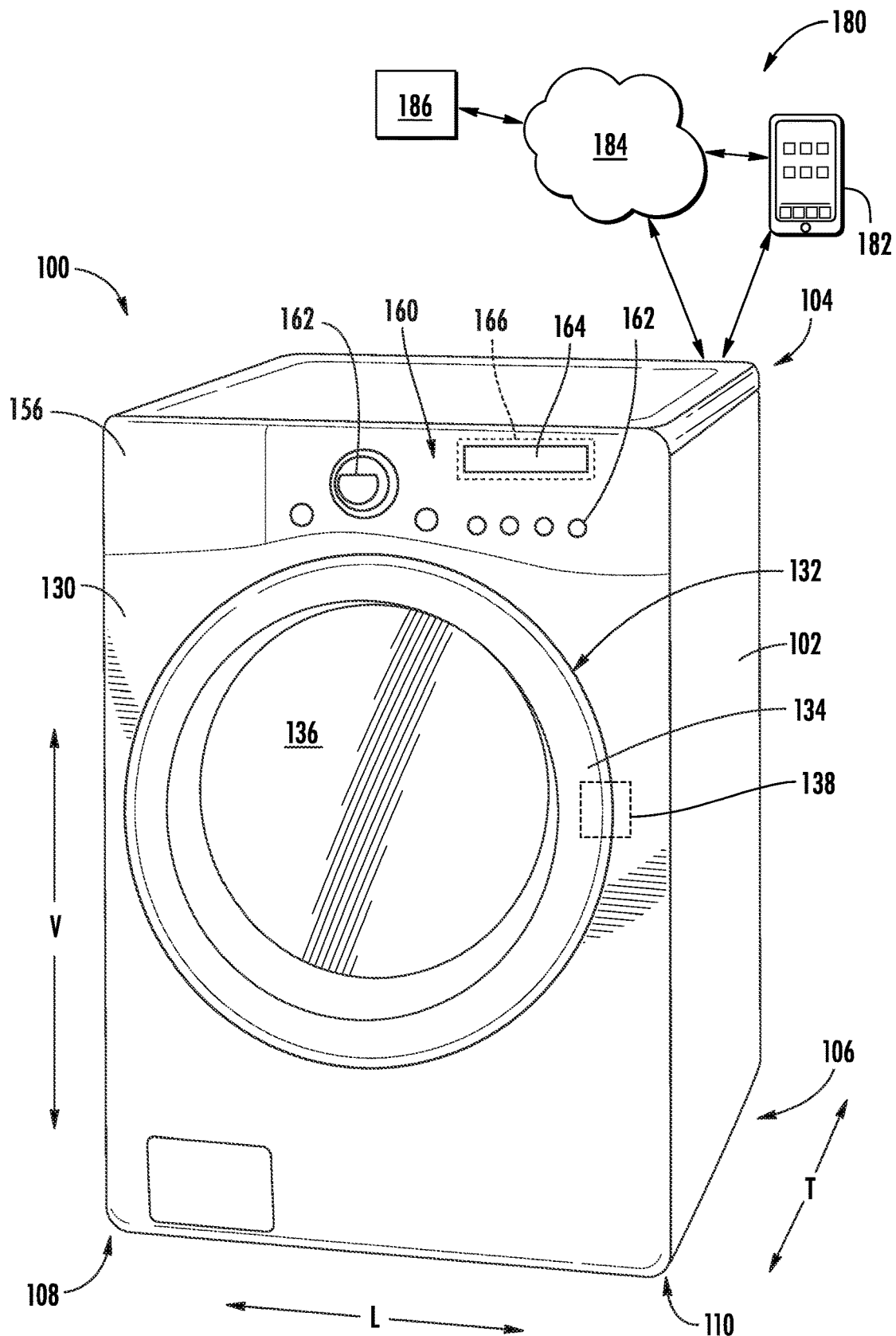
FIG. 1 provides a perspective view of an exemplary washing machine appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
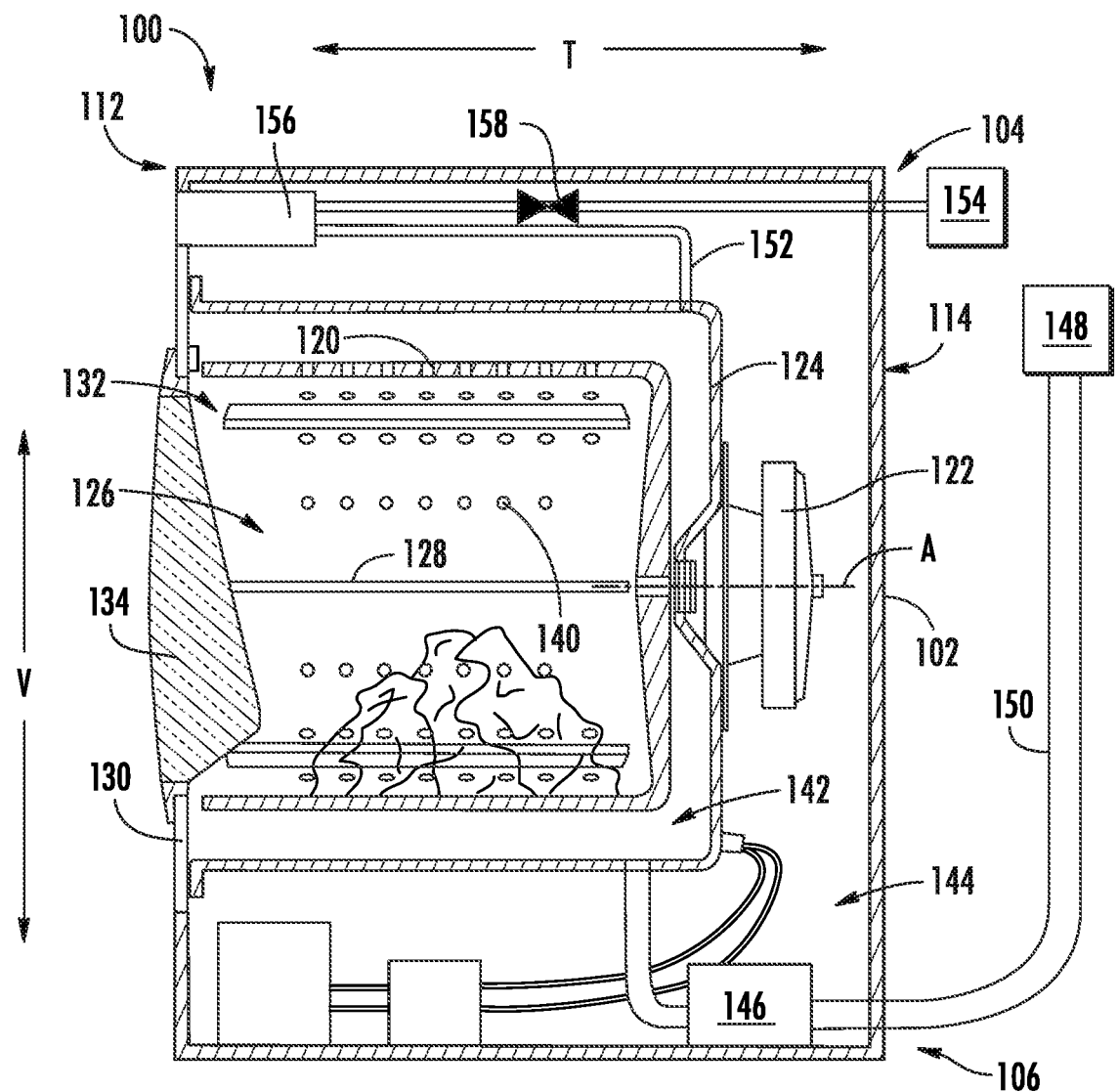
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined.

According to exemplary embodiments, washing machine appliance 100 includes a cabinet 102 that is generally configured for containing and/or supporting various components of washing machine appliance 100 and which may also define one or more internal chambers or compartments of washing machine appliance 100. In this regard, as used herein, the terms "cabinet," "housing," and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments. Washing machine appliance 100 may further include a latch assembly 138 (see FIG. 1) that is mounted to cabinet 102 and/or door 134 for selectively locking door 134 in the closed position and/or confirming that the door is in the closed position. Latch assembly 138 may be desirable, for example, to ensure only secured access to wash chamber 126 or to otherwise ensure and verify that door 134 is closed during certain operating cycles or events.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Washing machine appliance 100 may further include a wash fluid dispenser that is generally configured for dispensing a flow of water, wash fluid, etc. into wash tub 124. For example, a spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

During operation of washing machine appliance 100, laundry items are loaded into wash basket 120 through opening 132, and washing operation is initiated through operator manipulation of one or more input selectors or using a remote device (see below). Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

Referring again to FIG. 1, washing machine appliance 100 may include a control panel 160 that may represent a general-purpose Input/Output ("GPIO") device or functional block for washing machine appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, washing machine appliance 100 may include a display 164, such as a digital or analog display device generally configured to provide visual feedback regarding the operation of washing machine appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Washing machine appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of washing machine appliance 100. For example, signals generated by controller 166 may operate washing machine appliance 100, including any or all system components, subsystems, or interconnected devices, in response to the position of user input devices 162 and other control commands. Control panel 160 and other components of washing machine appliance 100 may be in communication with controller 166 via, for example, one or more signal lines or shared communication busses. In this manner, Input/Output ("I/O") signals may be routed between controller 166 and various operational components of washing machine appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware.

Additionally, or alternatively, the instructions can be executed logically and/or virtually using separate threads on one or more processors.

For example, controller 166 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform any methods, method steps, or portions of methods as disclosed herein. For example, in some embodiments, methods disclosed herein may be embodied in programming instructions stored in the memory and executed by controller 166.

The memory devices may also store data that can be retrieved, manipulated, created, or stored by the one or more processors or portions of controller 166. The data can include, for instance, data to facilitate performance of methods described herein. The data can be stored locally (e.g., on controller 166) in one or more databases and/or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of washing machine appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring again to FIG. 1, a schematic diagram of an external communication system 180 will be described according to an exemplary embodiment of the present subject matter. In general, external communication system 180 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 180 may be used to transfer data or other information to improve performance of one or more external devices or appliances and/or improve user interaction with such devices.

For example, external communication system 180 permits controller 166 of washing machine appliance 100 to communicate with a separate device external to washing machine appliance 100, referred to generally herein as an external device 182. As described in more detail below, these communications may be facilitated using a wired or wireless connection, such as via a network 184. In general, external device 182 may be any suitable device separate from washing machine appliance 100 that is configured to provide and/or receive communications, information, data, or commands from a user. In this regard, external device 182 may be, for example, a personal phone, a smartphone, a tablet, a laptop or personal computer, a wearable device, a smart home system, or another mobile or remote device.

In addition, a remote server 186 may be in communication with washing machine appliance 100 and/or external device 182 through network 184. In this regard, for example, remote server 186 may be a cloud-based server 186, and is thus located at a distant location, such as in a separate state, country, etc. According to an exemplary embodiment, external device 182 may communicate with a remote server 186 over network 184, such as the Internet, to transmit/receive data or information, provide user inputs, receive user notifications or instructions, interact with or control washing machine appliance 100, etc. In addition, external device 182 and remote server 186 may communicate with washing machine appliance 100 to communicate similar information.

In general, communication between washing machine appliance 100, external device 182, remote server 186, and/or other user devices or appliances may be carried using any type of wired or wireless connection and using any suitable type of communication network, non-limiting examples of which are provided below. For example, external device 182 may be in direct or indirect communication with washing machine appliance 100 through any suitable wired or wireless communication connections or interfaces, such as network 184. For example, network 184 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 180 is described herein according to an exemplary embodiment of the present subject matter. However, it should be appreciated that the exemplary functions and configurations of external communication system 180 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 3:
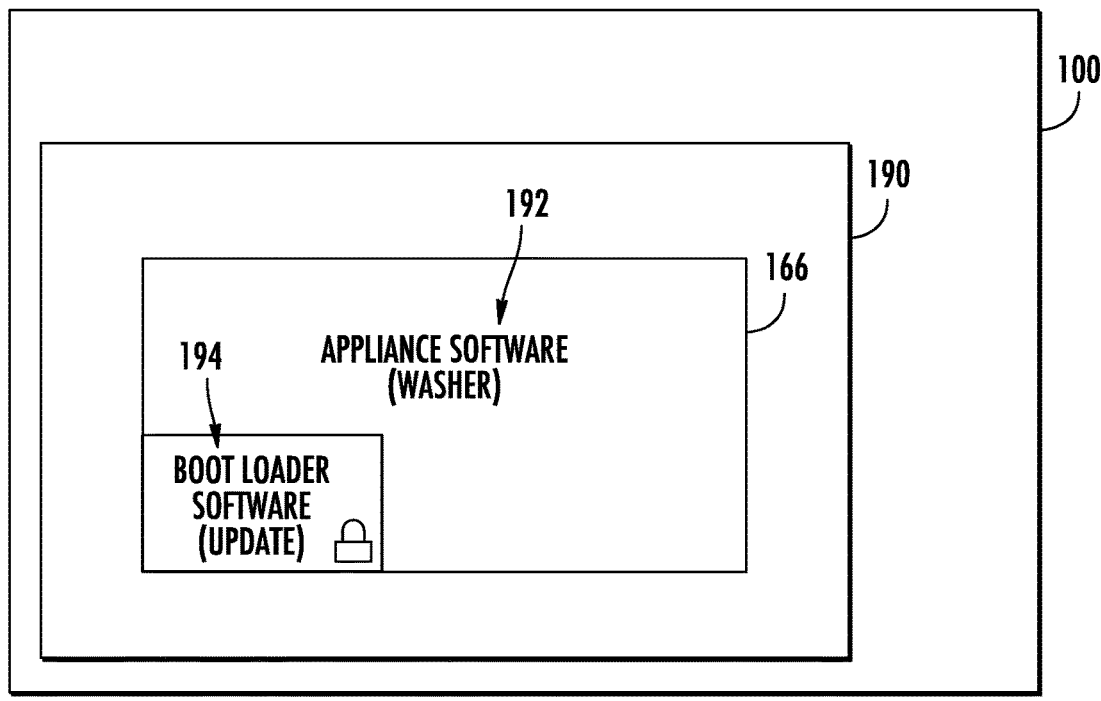
FIG. 3 provides an exemplary control board that may be used with the exemplary washing machine appliance of FIG. 1 in accordance with one embodiment of the present disclosure.

Referring now briefly to FIG. 3, a schematic illustration of an exemplary control board 190 including controller 166 is provided according to an exemplary embodiment of the present subject matter. It should be appreciated that control board 190 is only exemplary and does not shown all elements or features of an appliance controller. According to exemplary embodiments, control board 190 may include any suitable number and type of electronic components to facilitate appliance operation. For example, control board 190 may include a power supply or power regulating assembly that is directly coupled to an electrical source, e.g., such as a mains electricity supply. In addition, one or more controllers, such as controller 166, may be mounted on control board 190 within washing machine appliance 100.

Notably, according to exemplary embodiments of the present subject matter, controller 166 may generally include an operating software segment (e.g., identified generally by reference numeral 192) and a boot loader segment (e.g., identified generally by reference numeral 194). In general, boot loader segment 194 is a secure portion of the appliance software that is capable of manipulating or editing the operating software segment 192. By contrast, the operating software segment 192 is the segment of operating code or portion of controller 166 that regulates appliance operation, features, functions, etc. Thus, for example, when a user of the appliance performs an operating cycle, operating software segment 192 may receive operating cycle commands and parameters, e.g., selected through control panel 160 or a remote device, and may facilitate operation of washing machine appliance 100 in accordance with such parameters.

Although boot loader segment 194 and operating software segment 192 are described and illustrated herein as being separates segments on a control board, it should be appreciated that the present subject matter may not be limited to such physical separation. Indeed, there are alternative ways to implement upgrades such as having multiple images and the boot process selecting an active "partition" in the operating software. Thus, boot loader segment may alternatively be referred to as boot loader code, boot loader application programming interface (API), etc.

Operating software segment 192 may periodically need to be altered, e.g., by the manufacturer or a maintenance technician to address programming bugs, to add new or improved operating features, to update operating parameters, etc. According to exemplary embodiments, controller 166 is structured so that the appliance operating segment 192 may only be in manipulated using boot loader segment 194. As explained in more detail below, unauthorized access and control of boot loader segment 194 may be undesirable, e.g., as an unauthorized user may make undesirable changes to the operating software segment 192, obtain free access to appliance operation or features, or may take other undesirable actions.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, aspects of the present subject matter may be utilized in any other suitable appliance, particularly those utilized in a commercial setting. For example, aspects of the present subject matter may be utilized in refrigerators, ovens, dishwashers, etc.

Figure 4:
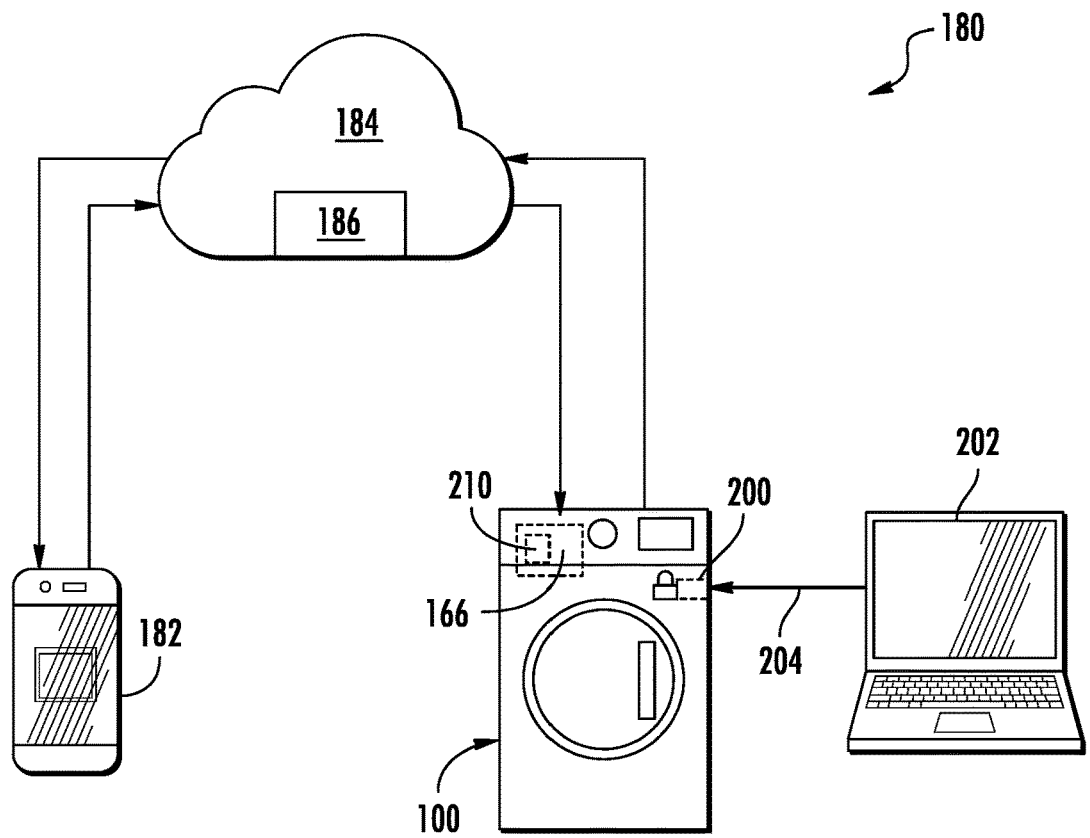
FIG. 4 provides an appliance external communication system that may be used with the exemplary washing machine appliance of FIG. 1 according to an exemplary embodiment of the present subject matter.

Referring now briefly to FIG. 4, a system and method for connecting an appliance such as washing machine appliance 100 to a remote server or network in accordance with aspects of the present subject matter will be described. For example, FIG. 4 may represent another system configuration or a practical implementation of external communication system 180 and washing machine appliance 100 as described above. Accordingly, like reference numerals may be used to refer to the same or similar features among embodiments.

Specifically, as illustrated, washing machine appliance 100 may generally include an external communication port 200 that is positioned on a cabinet 102 or which is otherwise accessible through cabinet 102. In general, external communication port 200 may be any suitable communications interface for interacting with an external source or device (identified herein generally by reference numeral 202). For example, according to exemplary embodiments, external communication port 200 may be an RJ45 network interface, a universal serial bus ("USB") interface, or any other suitable communications interface. According to exemplary embodiments, external communication port 200 is directly electrically and communicatively coupled to an appliance control board 190 (e.g., controller 166).

External communication port 200 may generally be configured for facilitating wired communications between external device 202 and the associated appliance (e.g., such as washing machine appliance 100). For example, external communication port 200 may be used facilitate appliance programming, to perform appliance maintenance, to adjust operating parameters, to modify the operating software, or to perform any other action using washing machine appliance 100. More specifically, external communication port 200 may be used by an external device 202 to access and operate boot loader segment 194.

While common uses of external communication port 200 may include appliance maintenance or manufacturer programming, this port may also inadvertently provide a security weakness or potential access point that may be used by hackers or other unauthorized user for nefarious or unauthorized purposes. In this regard, as noted above, an unauthorized user may plug in an external device 202 (such as a computer) to the RJ45 external communication port 200 using an electrical cable 204. In this manner, with the proper knowledge and skill, it may be possible for the unauthorized user to obtain undesirable access to the appliance control board, e.g., and may be capable of using boot loader segment 194 to manipulate operating software segment 192.

Referring still to FIG. 4, washing machine appliance 100 may be in operative communication with a remote device such as a cell phone or other remote device 182 via a network 184. In addition, network 184 may contain or be in communication with a remote server 186. According to exemplary embodiments, external communication interface 180 may be used by the owner or an authorized user of washing machine appliance 100 to perform specific operating cycles, make appliance adjustments, authorize credits, manage a payment system, charge for operation, or perform other suitable commercial operations using washing machine appliance 100. In this regard, for example, an appliance owner may have a software application on their external device 182 (e.g., an app on their cell phone) that permits full interaction and control of the connected appliance through external communication interface 180.

Notably, as explained briefly above, appliances such as washing machine appliance 100 may commonly be involved in financial transactions, such as where the owner of the appliance has placed the appliance in a shared environment where people may pay to use one or more features of the appliance. Notably, consumers may try to tamper with these appliances in order to perform appliance operations, enable features, or otherwise cause the appliance to perform certain functions for free. For example, a consumer may make unauthorized access to washing machine appliance 100, e.g., via external communication port 200, in order to obtain such appliance access and control. Moreover, an unauthorized user may adjust the operating software segment 192 by obtaining access to boot loader segment 194 through external communication port 200. Accordingly, aspects of the present subject matter are directed to systems and methods for preventing such unauthorized appliance tampering, and more particularly, to prevent access to the boot loader segment 194 of controller 166.

Now that the construction of washing machine appliance 100 and the configuration of controller 166 and external communication system 180 have been presented according to exemplary embodiments, an exemplary method 300 of operating a washing machine appliance will be described. Although the discussion below refers to the exemplary method 300 of operating washing machine appliance 100, one skilled in the art will appreciate that the exemplary method 300 is applicable to the operation of a variety of other washing machine appliances, such as vertical axis washing machine appliances. Moreover, method 300 may be used to prevent unauthorized access or use of any appliance, particularly commercial appliances. In exemplary embodiments, the various method steps as disclosed herein may be performed by controller 166 or a separate, dedicated controller.

According to various embodiments of the present subject matter, method 300 is generally intended to obtain approval from an owner or other supervisory user of washing machine appliance 100 before permitting access to boot loader segment 194 of controller 166. Moreover, method 300 may provide steps that facilitate interaction between the owner, the appliance, and any potential unauthorized users of the appliance (e.g., via external communication system 180). Although an exemplary implementation of method 300 is described below, it should be appreciated that variations and modifications to this method may be made while remaining within the scope of the present subject matter.

Figure 5:
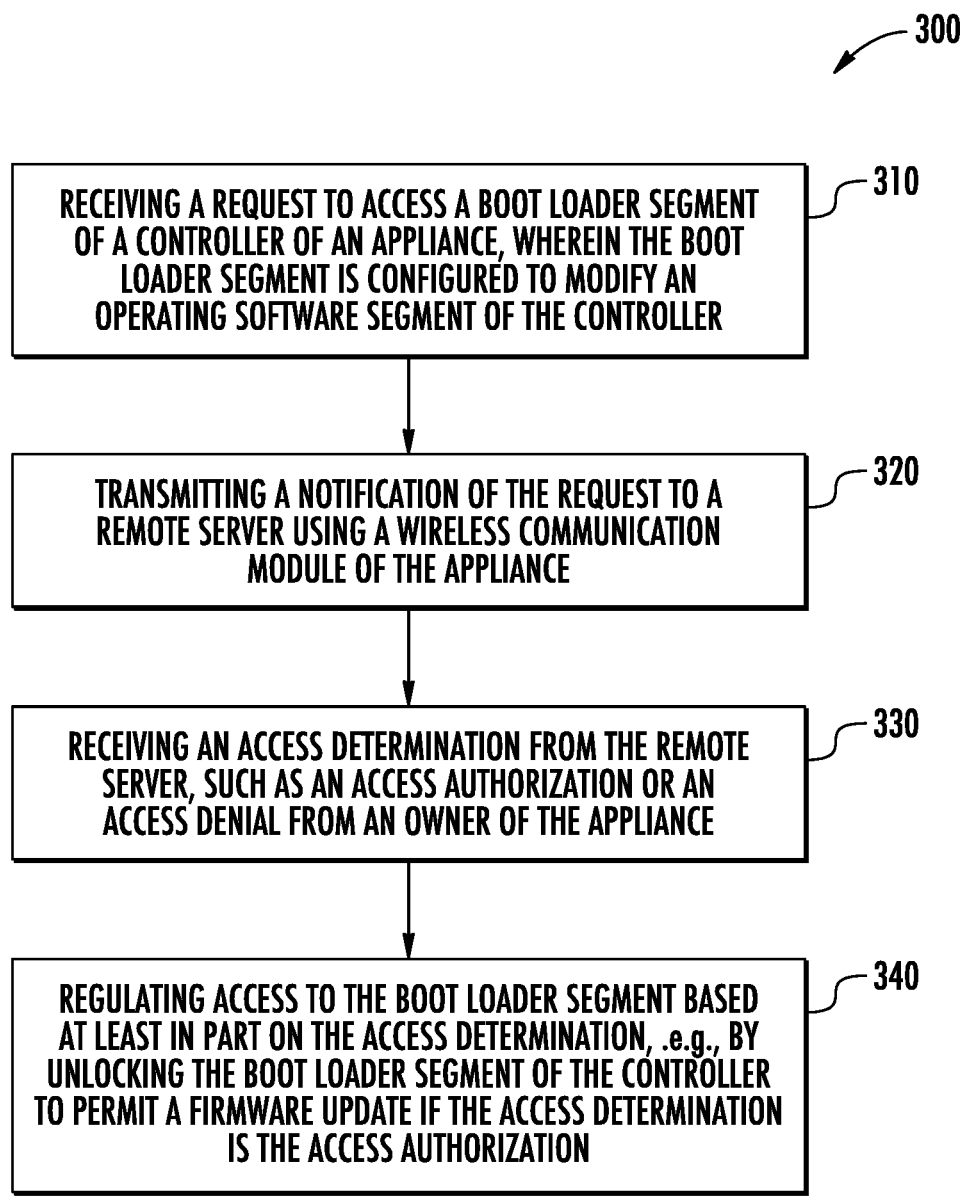
FIG. 5 illustrates a method for operating a washing machine appliance in accordance with one embodiment of the present disclosure.

Referring now to FIG. 5, method 300 includes, at step 310, receiving a request to access a boot loader segment of the controller of an appliance. For example, continuing the example from above, controller 166 may detect that someone is attempting to access the boot loader segment 194 which is configured to modify an operating software segment 192 of controller 166. It should be appreciated that the controller may detect port activity at external communication port 200 associated with access to the boot loader segment 194. In addition, or alternatively, controller 166 may identify a request to access the boot loader segment 194 in any other suitable manner.

For example, continuing the example from above, controller 166 of washing machine appliance 100 may detect port activity at external communication port 200, e.g., by detecting connection or data transfer through an RJ-45 communication interface. It should be appreciated that this port activity may be monitored by washing machine appliance 100 continuously, periodically, or upon any suitable trigger. According to alternative embodiments, this port activity may be determined in any other suitable manner. For example, detecting the port activity at the external communication port 200 may include determining that a connector has been plugged into the external communication port 200 (e.g., via a mechanical trigger or through electrical pulses generated upon contact) or determining that data has been transmitted through the external communication port 200.

Step 320 may include transmitting a notification of the request to a remote server using a wireless communication module of the appliance. In this regard, referring again briefly to FIG. 4, controller 166 is generally mounted within the appliance 100 and may include a wireless communication module 210 that may facilitate communication with external devices, e.g., via external communication system 180. Specifically, according to exemplary embodiments of the present subject matter, a wireless communication module 210 may be used to communicate with network 184, remote server 186, remote device 182, and/or external device 202.

Accordingly, when the request to access the boot loader segment is received (e.g., at step 310), wireless communication module 210 may transmit a notification of that request to the remote server 186 or another device on network 184. According to exemplary embodiments, this notification may be further provided to an owner of the device. In this regard, method 300 may include providing the owner notification of the request and receiving feedback from the owner or another authorized user, e.g., related to whether the port activity is valid or is tampering. For example, this user approval process is illustrated schematically in FIG. 4.

Step 330 may include receiving an access determination from the remote server, such as an access authorization or an access denial from an owner of the appliance. For example, as explained above, the notification of the request to access the boot loader may be sent to the owner's remote device 182 and the access determination may be communicated from the remote device 182. Accordingly, the owner of the appliance may make a determination as to whether the attempted access of the appliance is authorized and may either permit or deny such access.

According to alternative exemplary embodiments, the access assessment may be automated feedback based on maintenance schedules or other data. For example, according to an exemplary embodiment, the remote server 186 may include a record or schedule of when an appliance service session is being performed. Notably, during an appliance service session, the technician commonly needs to plug into the external communications port 200 to access the appliance control board, and more particularly, boot loader segment 194. Accordingly, if an appliance service session is being performed, method 300 may include presuming that the boot loader access is authorized (e.g., and may simply provide a user notification, not necessarily require user approval). By contrast, if boot loader access is attempted when an appliance service session is not being performed, method 300 may include assuming that the access is not authorized (or otherwise seek owner approval). Accordingly, method 300 may include determining that the access determination is an access denial if the appliance service session is not being performed and may determine that the access determination is an access authorization if the appliance service session is being performed.

Method 300 may further include, at step 340, regulating access to the boot loader segment based at least in part on the access determination. For example, if the access determination results in access authorization, controller 166 may unlock the boot loader segment 194 to permit access to and control of boot loader segment 194. In this manner, during an authorized boot loader access session, the operating software segment 192 may be updated, e.g., to permit a firmware update or for one or more reasons described above. By contrast, if the access determination was an access denial, controller may lock boot loader segment 194 (e.g., or may leave boot loader segment 194 locked) to prevent programming of controller 166 and manipulation of operating software segment 192.

Notably, regulating access to the boot loader may include periodically unlocking boot loader segment 194 after user authorization is received at step 330. However, it may further be desirable to place a timeout period after which the boot loader segment 194 is relocked. In this manner, further access to boot loader segment 194 and manipulation of operating software segment 192 may be prevented after the authorized use has occurred (or even if the authorized use was not performed within the predetermined timeout period). Furthermore, it should be appreciated that the user of the appliance may manually relock the boot loader segment 194, e.g., directly through control panel 160, using a software application on remote device 182, or in any other suitable manner. This locking procedure may also be performed directly by an appliance technician.

Method 300 may further include communicating with the owner or an authorized user regarding the access determination or otherwise confirming user approval/disapproval. For example, according to an exemplary embodiment, step 340 may further include providing an owner notification regarding any determination regarding boot loader access. For example, the owner notification may be provided through the user interface panel (e.g., such as control panel 160) or through a remote device 182 (such as a user's cell phone).

FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using washing machine appliance 100 as an example, it should be appreciated that this method may be applied to the operation of any other appliance, particularly any commercial appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
a cabinet;
an external communication port positioned on the cabinet;
a wireless communication module in wireless communication with a remote server through an external network; and
a controller comprising a boot loader segment and being in operative communication with the external communication port and the wireless communication module, the controller being configured to:
detect port activity at the external communication port, the port activity being associated with a request to access the boot loader segment of the controller;
transmit a notification of the request to the remote server using the wireless communication module;
receive an access determination from the remote server; and
regulate access to the boot loader segment through the external communication port based at least in part on the access determination.

2. The appliance of claim 1, wherein the external communication port is an RJ45 port.

3. The appliance of claim 1, wherein the controller is in operative communication with a remote device through the external network, and wherein the access determination is communicated from the remote device.

4. The appliance of claim 1, wherein the access determination comprises at least one of an access authorization or an access denial.

5. The appliance of claim 4, wherein the access determination is the access authorization, and wherein regulating access to the boot loader segment comprises:
unlocking the boot loader segment of the controller to permit a firmware update.

6. The appliance of claim 5, wherein regulating access to the boot loader segment further comprises:
relocking the boot loader segment of the controller to prevent the firmware update after a predetermined amount of time has passed since the boot loader segment was unlocked.

7. The appliance of claim 4, wherein the access determination is the access denial, and wherein regulating access to the boot loader segment comprises:
locking the boot loader segment of the controller and preventing programming of the controller.

8. The appliance of claim 1, wherein the controller is further configured to:
provide an owner notification regarding the request to access.

9. The appliance of claim 8, further comprising:
a user interface panel, wherein the owner notification is provided through the user interface panel.

10. The appliance of claim 8, wherein the controller is in operative communication with a remote device through the external network, and wherein the owner notification is provided through the remote device.

11. The appliance of claim 1, wherein the controller further comprises an operating software segment, wherein the boot loader segment is configured to modify the operating software segment.

12. The appliance of claim 1, wherein the appliance is a washing machine appliance, a dryer appliance, or a combination washer/dryer appliance.

13. A method of operating an appliance, the appliance comprising an external communication port, a wireless communication module in wireless communication with a remote server through an external network, and a controller comprising a boot loader segment, the method comprising:
   detecting port activity at the external communication port, the port activity being associated with a request to access the boot loader segment of the controller;
   transmitting a notification of the request to the remote server using the wireless communication module;
   receiving an access determination from the remote server; and
   regulating access to the boot loader segment through the external communication port based at least in part on the access determination.

14. The method of claim 13, wherein the external communication port is an RJ45 port.

15. The method of claim 13, wherein the access determination comprises at least one of an access authorization or an access denial.

16. The method of claim 15, wherein the access determination is the access authorization, and wherein regulating access to the boot loader segment comprises:
   unlocking the boot loader segment of the controller to permit a firmware update.

17. The method of claim 15, wherein the access determination is the access denial, and wherein regulating access to the boot loader segment comprises:
   locking the boot loader segment of the controller and preventing programming of the controller.

18. The method of claim 13, further comprising:
   providing an owner notification regarding the request to access.

19. The method of claim 18, wherein the appliance further comprises:
   a user interface panel, wherein the owner notification is provided through the user interface panel.

20. The method of claim 18, wherein the controller is in operative communication with a remote device through the external network, and wherein the owner notification is provided through the remote device.

* * * * *